United States Patent
Bazzica et al.

(10) Patent No.: US 9,876,901 B1
(45) Date of Patent: Jan. 23, 2018

(54) CONVERSATIONAL CALL QUALITY EVALUATOR

(71) Applicant: Google Inc., Mountain View, CA (US)

(72) Inventors: Alessio Bazzica, Delft (NL); Minyue Li, Solna (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/261,635

(22) Filed: Sep. 9, 2016

(51) Int. Cl.
| | |
|---|---|
| *H04M 3/22* | (2006.01) |
| *G10L 15/00* | (2013.01) |
| *H04M 3/32* | (2006.01) |
| *G10L 15/26* | (2006.01) |
| *G10L 25/51* | (2013.01) |
| *G10L 25/78* | (2013.01) |
| *G10L 15/05* | (2013.01) |
| *G10L 13/08* | (2013.01) |
| *H04L 29/06* | (2006.01) |
| *H04L 12/26* | (2006.01) |

(52) U.S. Cl.
CPC ............ *H04M 3/323* (2013.01); *G10L 13/08* (2013.01); *G10L 15/05* (2013.01); *G10L 15/26* (2013.01); *G10L 25/51* (2013.01); *G10L 25/78* (2013.01); *H04L 43/0852* (2013.01); *H04L 65/80* (2013.01); *H04M 3/2236* (2013.01); *H04M 2201/40* (2013.01)

(58) Field of Classification Search
None
See application file for complete search history.

(56) References Cited

U.S. PATENT DOCUMENTS

| | | | | |
|---|---|---|---|---|
| 5,848,384 A | * | 12/1998 | Hollier | G10L 25/69 704/231 |
| 6,275,797 B1 | * | 8/2001 | Randic | G10L 25/69 704/231 |

(Continued)

OTHER PUBLICATIONS

Wagner Robert A. and Fischer, Michael J., "The String-to String Correction Problem", Journal of the Association for Computing Machinery (JACM), vol. 21, No. 1 Jan. 1974, pp. 168-173.

*Primary Examiner* — Quoc D Tran
(74) *Attorney, Agent, or Firm* — IP Spring

(57) ABSTRACT

Aspects of the disclosure simulate a conversation over a real-time communication system and a reference script shared between the communication devices serves as a basis for comparison against the received speech-recognized conversation. A method of evaluating call quality of a real-time communication system that includes at least two communication devices is disclosed that includes receiving a reference script, the reference script containing linguistic contents of an audio signal being sent to one of the communication devices; generating an evaluation transcript by applying speech recognition to the audio signal being received; comparing the reference script with the evaluation transcript; and generating a call quality metric of the real-time communication system based on the comparison. The call quality metric may also include a communication delay which may be evaluated by determining a duration of a speaking turn; determining a duration of a listening turn from the audio signal being received by one of the communication devices; and estimating a communication delay of the audio signal based on the duration of the speaking turn and the listening turn.

20 Claims, 8 Drawing Sheets

(56) References Cited

U.S. PATENT DOCUMENTS

| | | | | |
|---|---|---|---|---|
| 6,622,121 B1* | 9/2003 | Crepy | .................... | G10L 15/01 |
| | | | | 704/243 |
| 6,718,296 B1* | 4/2004 | Reynolds | ............ | H04M 3/2236 |
| | | | | 375/224 |
| 8,300,536 B2* | 10/2012 | Hughes | ............. | H04L 29/06027 |
| | | | | 370/236 |
| 8,737,571 B1* | 5/2014 | Seeley | ................ | H04M 3/2236 |
| | | | | 379/1.03 |
| 2002/0167937 A1* | 11/2002 | Goodman | ............... | G10L 25/69 |
| | | | | 370/352 |
| 2005/0015253 A1* | 1/2005 | Rambo | ............... | H04M 3/2236 |
| | | | | 704/246 |
| 2009/0109965 A1* | 4/2009 | Matthews | ........... | H04L 12/2602 |
| | | | | 370/356 |
| 2013/0080172 A1* | 3/2013 | Talwar | .................... | G10L 25/69 |
| | | | | 704/260 |
| 2014/0257815 A1* | 9/2014 | Zhao | .................... | G10L 13/086 |
| | | | | 704/260 |

* cited by examiner

On each side and for each listening turn, we collect the estimated delay terms $\delta_i$. The *overall delay score* $\delta$ is the average over the $\delta_i$ terms.

The overall delay scores for A and B are $\delta^A$ and $\delta^B$ respectively.
They are function of <u>both</u> VADs activation periods ($\square$).

CONVERSATIONAL CALL QUALITY EVALUATOR

BACKGROUND

Real-time communication (RTC) is an integrated communication medium based on an upcoming W3C standard that makes use of other components like HTML5/JavaScript, the iLBC audio codec, and the VP8 video codec. It is has been adopted by many major browsers.

Despite the many advances in RTC and VoIP (Voice over IP) technology, there remains a technical problem for an objective way to directly assess a RTC and VOIP applications in terms of its quality for conversational uses. Conventional evaluation techniques for such applications rely upon assessments that measure properties such as latency and jitter. Such conventional assessment techniques may not reliably indicate call quality as perceived by a human listener. A more reliable assessment tool would be helpful for ensuring quality of service (QoS) and may also prove useful for the further development of RTC and VOIP applications.

Existing techniques for assessing call quality are technically deficient for lacking certain important features. For example, some existing approaches are subjective rather than objective, while others are designed for indirect evaluation, relying on features of the application and network under test, rather than real signals, leading to less accurate results. In addition, other existing techniques are not well-suited for conversational uses. While such approaches may be adequate for one-way communication, the measures they produce do not adequately reflect factors that affect human perception of call quality during conversations conducted via RTC or VoIP.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to audio signal processing. More specifically, aspects of the present disclosure relate to assessing speech quality through conversational simulation.

Aspects of the disclosure include a method of evaluating audio quality of a real-time communication system that includes at least two communication devices, including: receiving a reference script, the reference script containing linguistic contents of an audio signal being sent to one of the communication devices; generating an evaluation transcript by applying speech recognition to the audio signal being received; comparing the reference script with the evaluation transcript; and generating a call quality metric of the real-time communication system based on the comparison.

Further aspects include determining a duration of a speaking turn; determining a duration of a listening turn from the audio signal being received by one of the communication devices; and estimating a communication delay of the audio signal based on the duration of the speaking turn and the listening turn.

Moreover, the determining a duration of the speaking turn may include inputting a duration value. Also, determining a duration of the speaking turn may include applying a voice activity detection process to the audio signal being sent from one of the communication devices.

Furthermore, determining a duration of the listening turn may include: activating a voice activity detection process based on the duration of the speaking turn; and determining when the received speech in the listening turn ends using the voice activity detection, wherein the step of determining the duration of the listening turn is based on when the listening turn ends as determined by said determining step.

Still other aspects determine a duration of the listening turn by receiving a synchronization signal indicating a start of the received speech, wherein the step of determining the duration of the listening turn is based on receipt timing of the synchronization signal and when the listening turn ends as determined by said determining step.

Further aspects include a turn-based method of evaluating audio quality of a real-time communication system using a first communication and a second communication device communicating via a real-time communication system, the first and second communication devices implementing a method, including: receiving, at the first and second communication devices, a turn-based reference script containing linguistic contents of turn-based speech including respective speaking turns for the first and second communication devices; generating, at the first and second communication devices during each of their respective speaking turns, audible speech; receiving audio signals, at the second and first communication devices during each of their respective listening turns, the audio signals including the produced speech from respectively corresponding speaking turns of the first and second communication devices; generating, at the first and second communication devices during each of their respective listening turns, evaluation transcripts by applying speech recognition to the produced speech in the received audio signal; comparing, at the first and second communication devices, the turn-based reference script with the respective evaluation transcript for each of the respectively corresponding listening turns; and generating an overall call quality metric of the real-time communication system based on the comparisons.

Still further aspects include receiving, at the first and second communication devices, expected durations of the speech in the audio signal for each of the speaking turns of the respectively corresponding second and first communication devices; enabling, at the first and second communication devices during their respective listening turns, voice activity detection according to the expected duration of the speech in the audio signal; detecting, at the first and second communication devices during their respective listening turns, when the speech being received for each listening turn ends using the voice activity detection; and determining, at the first and second communication devices during their respective listening turns, communication delays for each listening turn based on the expected durations and the determination of when the speech being received for each listening turn ends.

Yet further aspects include receiving, at the first and second communication devices during their respective listening turns, a synchronization signal for each listening turn indicating a start of the received speech, wherein the step of determining the communication delays determines the communication delays based on receipt timings of the synchronization signals and the determination of when the speech being received for each listening turn ends.

Even further aspects include wherein the audio signal containing speech is generated by a text-to-speech process based on the turn-based reference script. Moreover, the audio signal containing speech is generated by playing back a speech recording of each speaking turn and the evaluation transcript is generated using speech recognition.

Other aspects include generating an overall call quality metric of the real-time communication system based on the comparisons including: for each listening turn (i) of the first and second communication device:

aligning the evaluation transcript of the listening turn with a corresponding speaking turn of the turn-based reference script, and determining a number of corrections $C_i$, deletions $D_i$, insertions, $I_i$ and substitutions $S_i$ for each listening turn (i) by comparing the aligned evaluation transcript of the listening turn with the corresponding speaking turn of the turn-based reference script, individually summing $C_i$, $D_i$, $I_i$, and substitutions $S_i$ over all the listening turns (i) to respectively calculate and C, D, I and S; and calculating an overall word error rate (WER) based on WER=(D+I+S)/(S+D+C).

As an alternative to the WER calculation explained above, another aspect may calculate $WER_i$ (word error rate per speaking turn and then average the $WER_i$ values.

According to another embodiment, an apparatus for evaluating audio quality of a real-time communication system that includes at least two communication devices, including a processor and a storage device storing instructions that are operable, when executed by the processor, to cause the processor to perform operations including: receiving a reference script, the reference script containing linguistic contents of an audio signal being sent to one of the communication devices; generating an evaluation transcript by applying speech recognition to the audio signal being received; comparing the reference script with the evaluation transcript; and generating a call quality metric of the real-time communication system based on the comparison.

Another aspect is the processor and storage device storing further instructions that are operable, when executed by the processor, to perform additional operations including: determining a duration of a speaking turn; determining a duration of a listening turn from the audio signal being received by one of the communication devices; and estimating a communication delay of the audio signal based on the duration of the speaking turn and the listening turn.

Yet another aspect is that the determining a duration of the speaking turn includes inputting a duration value. Also, the determining a duration of the speaking turn may include applying a voice activity detection process to the audio signal being sent from one of the communication devices.

In a further aspect the determining a duration of the listening turn includes: activating a voice activity detector based on the duration of the speaking turn; and determining when the received speech in the listening turn ends using the voice activity detector, wherein the step of determining the duration of the listening turn is based on when the listening turn ends as determined by said determining step.

In a yet further aspect, the determining a duration of the listening turn further includes: receiving a synchronization signal indicating a start of the received speech, wherein the step of determining the duration of the listening turn is based on receipt timing of the synchronization signal and when the listening turn ends as determined by said determining step.

According to another embodiment, a receiving communication device evaluates audio quality of a real-time communication received from a transmitting communication device via a real-time communication system, the receiving communication device comprising: a processor and a storage device storing instructions that are operable, when executed by the processor, to cause the processor to perform operations including: receiving an audio signal, the audio signal including speech; receiving a reference script containing linguistic contents of the speech included in the audio signal; generating an evaluation transcript by applying speech recognition to the speech in the received audio signal; comparing the reference script with the evaluation transcript; and generating a call quality metric of the real-time communication system based on the comparison.

In a further aspect, the processor and storage device storing further instructions that are operable, when executed by the processor, to perform additional operations including: receiving an expected duration of the speech in the audio signal; enabling a voice activity detector according to the expected duration of the speech in the audio signal; detecting when the speech being received ends using the voice activity detector; and determining a communication delay based on the when expected duration and the determination of when the speech being received ends.

In a yet further aspect, the processor and storage device storing further instructions that are operable, when executed by the processor, to perform additional operations including: receiving a synchronization signal indicating a start of the received speech, wherein the step of determining the communication delay determines the communication delay based on receipt timing of the synchronization signal and the determination of when the speech being received ends.

In a still further aspect, the audio signal containing speech is generated by a text-to-speech process based on the reference script In another aspect, the audio signal containing speech is generated by playing back a speech recording and the reference script is generated using speech recognition.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
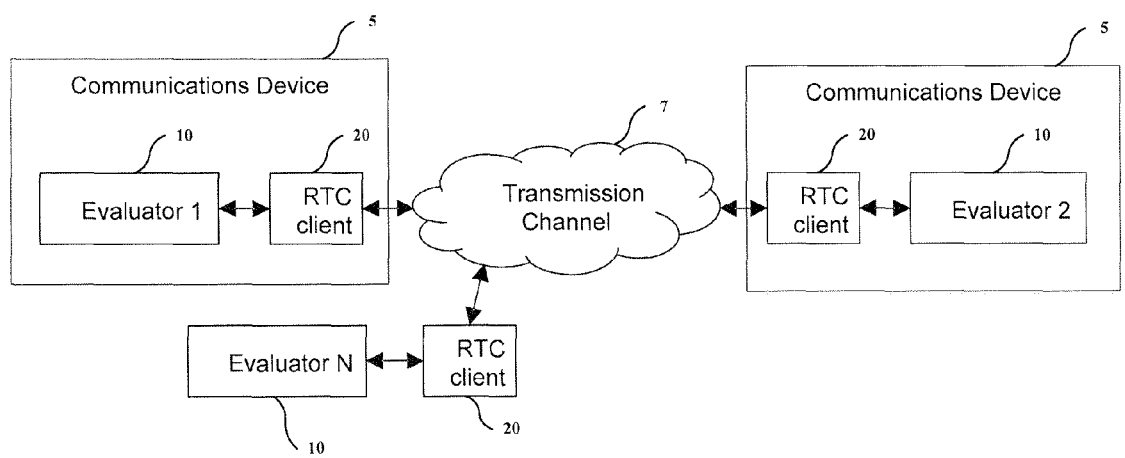
FIG. 1 is a block diagram illustrating an example high-level system for assessing conversational quality of a real-time communication application according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

IP-based voice and video communication has become a popular tool for voice calling, video chatting, conferencing, etc. Unlike the traditional PSTN service, IP-based real time communication is highly flexible in deployment and access. For example, a VoIP application can run on a variety of hardware, ranging from a stationary PC to a smart watch. These devices can also access the Internet through a variety of networks, ranging from a cellular network to an optical fiber connection. Since there are so many communication scenarios, it is hard to evaluate an application during its development, or monitor a service during its use. A platform that can automatically assess the quality of various real-time communication applications, under different conditions, is of great value. It is desirable that the quality assessment reflects the most relevant aspects of a human's opinion on the call quality. Embodiments disclosed herein provide technical solutions to solve these and other technical problems.

Embodiments of the present disclosure relate to methods and systems for assessing call quality in a manner that more closely corresponds to how a human listener perceives call quality. As will be described in greater detail below, the system of the present disclosure may simulate a conversation (e.g., between two participants or, in at least one embodiment, multiple participants) in order to reflect the most realistic scenario. Various features may be extracted during the simulation of the conversation, and the extracted features may be used to generate an overall score (e.g., measurement) indicative of the quality.

The methods and systems of the present disclosure include a number of advantageous features. For example, in accordance with at least one embodiment, a call engine may be configured to control the sending of local voice (an audio signal representing human speech being transmitted from a local device to a remote device). Due to changing network conditions and other factors, the voice of a remote party in a call may be significantly delayed, distorted or even lost. To simulate a smooth conversation (which means sending local voice at the right time so as to respond to the received voice promptly while also avoiding double talking), the systems and methods described herein may be designed to adapt to different delays of various networks thereby enhancing the technical solutions provided herein. Moreover, the call engine may be used to coordinate the adaption of the system to such different delays of various networks even further enhancing the technical solutions provided herein.

Another example feature of the methods and systems described herein is the use of a speech recognizer to transcribe received voice. Conversational quality is largely about the intelligibility of a conversation. Therefore, in one or more embodiments the system may utilize a speech recognizer to simulate a human listener.

Yet another example feature relates to an evaluation engine that may be configured to assess the call quality based on the scripts and transcripts of the conversation.

Quality related metrics may be extracted by comparing the ground truth scripts and the transcripts. In at least one embodiment, this extraction may be done by an evaluation engine 18.

Another aspect involves the use of turn-based simulation of a call in which there is a speaking turn and a listening turn. Moreover, other aspects include how to automatically switch turns in each of the participating communication devices. Still other aspects include evaluating call quality of a simulated turn-based call which is a highly advantageous technical solution because it assesses call quality in a manner that closely corresponds to actual service conditions of a call between human participants. Moreover, embodiments disclosed herein may test any RTC platform and any VOIP software to assess call quality.

Still further technical advantages flow from the ability to assess call quality with respect to the amount of audible distortions by, for example, relying on the intelligibility of received speech/voice.

FIG. 1 is a block diagram illustrating a high-level system for assessing conversational quality of a real-time communication application. As shown therein, communication devices 5 communicate over a real-time transmission channel 7 using RTC (Real-Time Communication) client 20. The communication devices 5 may be constructed using conventional technology such as mobile phones, IP phones, etc. and may use a conventional RTC client 20 such as an audio calling or conferencing application. An evaluator 10 is also installed on the communication device 5 and may be implemented with a software application running on a CPU (not shown) that is part of the communication device 5. Further details of the hardware options are described below in reference to FIG. 8.

The functionality of the evaluator 10 will be described in detail below in reference to FIG. 2 and is part of the functionality as described in the flowcharts of FIGS. 3-5. As shown in the bottom part of FIG. 1, the evaluator 10 (e.g. evaluator N of a communication system) may alternatively be implemented outside of a traditional communication device such as a software application installed on a general purpose computer as further described below in relation to FIG. 8.

Figure 2:
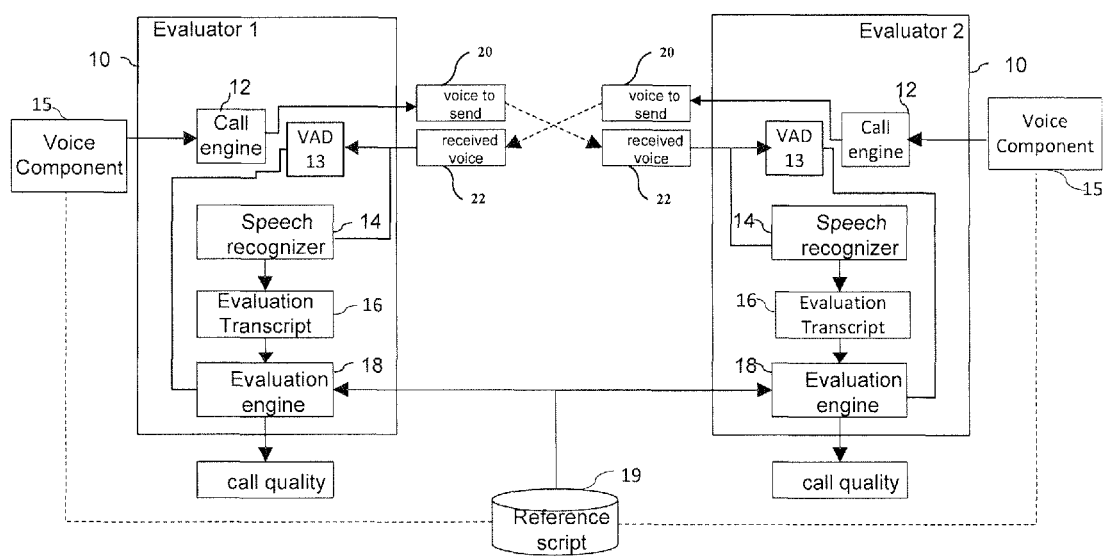
FIG. 2 is a block diagram illustrating example call quality evaluators at ends of a transmission path according to one or more embodiments described herein.
Figure 3:
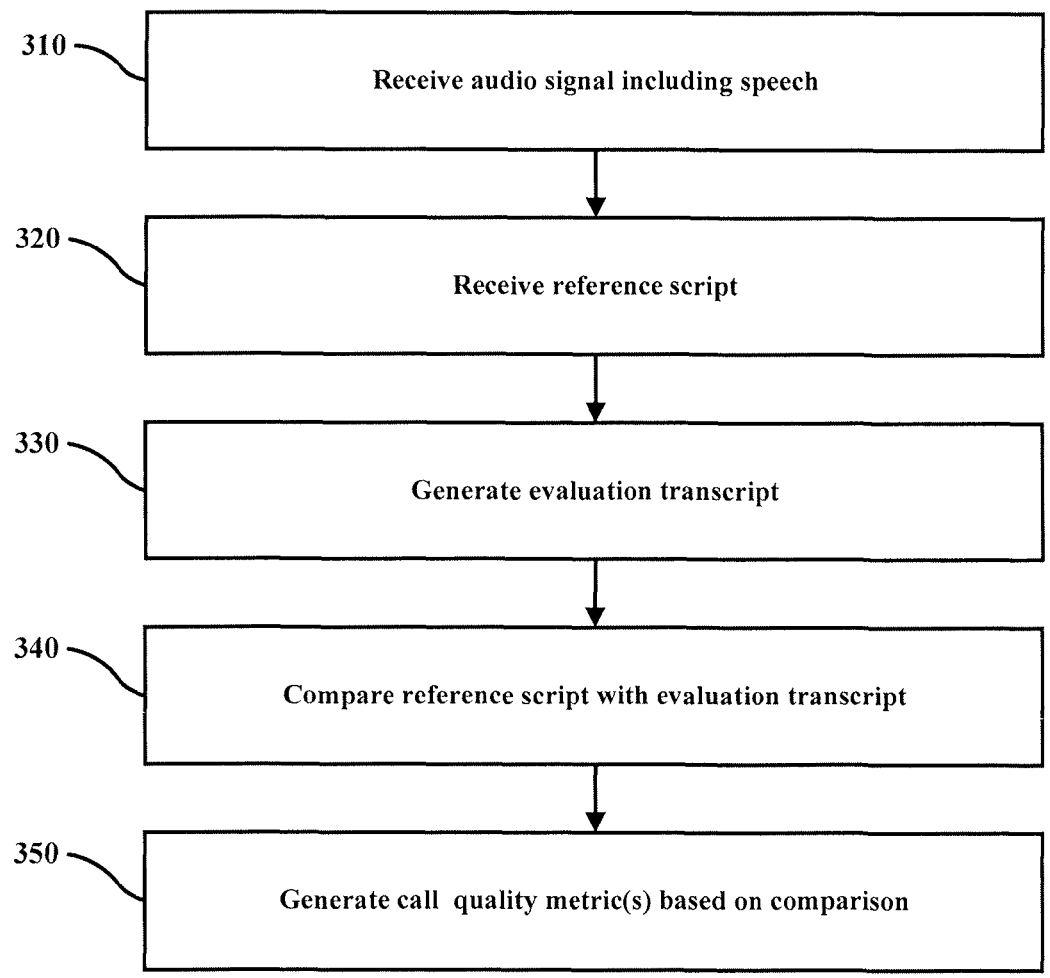
FIG. 3 is a flowchart illustrating an inventive process for evaluating call quality according to one or more embodiments described herein.
Figure 4:
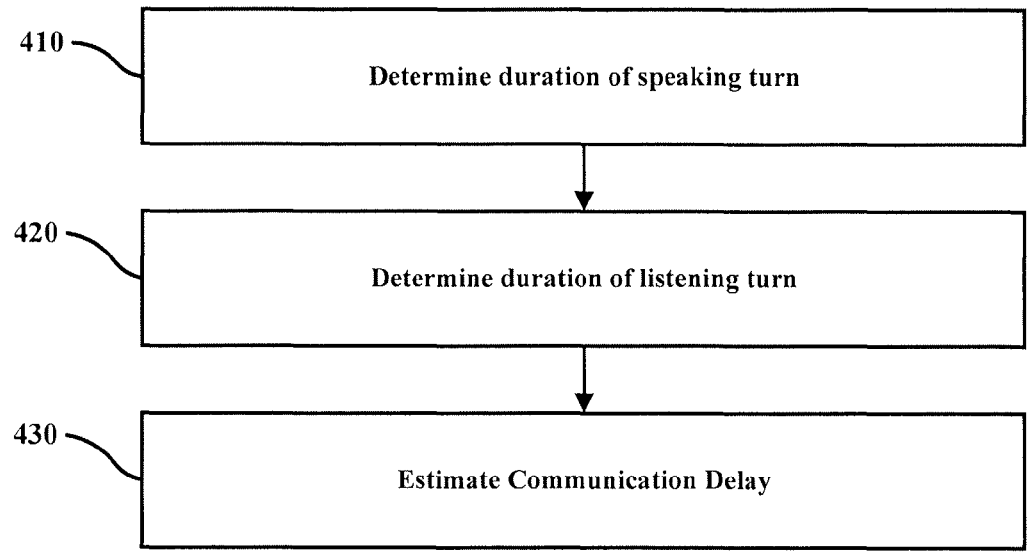
FIG. 4 is a flowchart illustrating an inventive process for estimating communication delay according to one or more embodiments described herein.

FIG. 2 is a block diagram illustrating components of the evaluator 10 and FIG. 3 is a flowchart illustrating functions performed by the evaluator 10 that is "listening" or receiving from a "speaking" evaluator 10 on the other side of the transmission channel 7. The call engine 12 handles sending and receiving (310) of audio signals containing voice/speech and generally simulates a real-time conversations in conjunction with the speech recognizer 14 and RTC client 20.

The reference script 19 may be a text file of a conversation between two or more simulated parties stored on a memory device. In one embodiment, a reference script 19 is shared (e.g. between evaluator 1 and evaluator 2) by, for example, evaluators 1 and 2 exchanging reference scripts 19 for their respective sides of the conversation or, alternatively, the reference script 19 may contain both sides of the simulated conversation. Furthermore, the reference script 19 may be turn-based (aka turn-based reference script) such that it includes, for example, speaking turns for both evaluator 1 and evaluator 2. Sharing of the reference script 19 may be accomplished by evaluator 1 receiving (320) the reference script from evaluator 2. In a turn-based call simulation both evaluators 1 and 2 would receive turn-based reference scripts 19 from the other evaluators 2 and 1, respectively.

The reference script 19 may be converted to audible speech in the voice component 15 by a conventional text-to-speech conversion process and transmitted to the transmission channel 7 by call engine 12 as voice to send 20. Alternatively, the voice component 15 may include an audio file of a previously recorded conversation, having a known reference script 19, and the audio file may be played back by call engine 12 to evaluator 2 via the call engine 12 and the transmission channel 7 as voice to send 20.

Upon receiving (310) the voice (received voice 22), a speech recognizer 14 generates (330) an evaluation transcript 16 by converting the audible speech into text using a conventional speech recognition process. The conventional speech recognition used by speech recognizer 14 should preferably not utilize a learning algorithm or at least not learn during a simulated call session in order to obtain consistent recognition accuracy throughout the call session. Learning during the call session may affect the call quality measurement values in an adverse way.

An evaluation engine 18 compares (340) the reference script 19 against the evaluation transcript 16 to generate (350) call quality metrics details of which are further explained below.

The evaluation transcript 16 is another text file that contains the recognized words from the received speech. The evaluation transcript 16 may include errors that are a result of the speech recognizer's inability to correctly recognize certain part(s) of the received speech. Such errors are generally indicative of call quality and are used by aspects as a call quality metric.

As will be described in greater detail below, numerous features related to call quality can be extracted. For example, in at least one embodiment, word error rate (WER) and/or delay may be features extracted during the operation of the call simulator. Each of these example features will be further described below.

A significant factor of call quality is the intelligibility of the voices over the transmission channel 7. According to aspects, the transcribed text may be compared with the pre-defined script to obtain (e.g., determine, calculate, compute, etc.) a WER measurement. WER may be obtained by aligning the words in the reference script 19 with the words in the evaluation transcript 16 using a conventional process such as the one described in "The String-to-String Correction Problem" by Wagner published in Journal of the ACM (JACM), volume 21, Issue 1, January 1975. After aligning the words, the evaluation engine 18 compares (340) the reference script 19 against the evaluation transcript 16. Then the evaluation engine 18 may count the number of corrections (C), deletions (D), insertions (I), and substitutions (S), respectively. In at least one embodiment, WER may be calculated as $$\text{WER} = (D+I+S)/(S+D+C).$$

The embodiment described above calculates a WER that does not rely upon turns on a simulated turn-based call. More specifically, the embodiment described above concatenates all of the evaluation transcripts (e.g. of each turn) and determines the best word alignment with the entire reference script 19.

In an alternative, aspects may leverage the turn-based call simulation by aligning the words for a single turn in the turn-based reference script 19 with the words of a single turn in the evaluation transcript 16. In this alternative, the process iterates over all of the turns to compute an overall WER. This alternative is further illustrated by the pseudo-code below:

$C,D,I,S \leftarrow 0$ for each listening turn evaluation transcript 16←text read by speech recognizer 14 on the remote end $(C_i, D_i, I_i, S_i)$←dynamic string alignment(script, evaluation transcript 16)

$C \leftarrow C + C_i$ $D \leftarrow D + D_i$ $I \leftarrow I + I_i$ $S \leftarrow S + S_i$ $\text{WER} = (D+I+S)/(S+D+C)$ In addition to WER, another significant feature of call quality is delay. An advantage that WER and delay features have in common is that they do not require a copy of the full original audio signal (near end), but only lightweight information which can be locally derived beforehand (in the simulated call case) or extracted on-the-fly by analyzing the played out signal (online monitoring case).

In accordance with at least one embodiment of the present disclosure, instead of simulating a speaker, the system may use an online-based speech recognizer to monitor a real speaker. For example, transcribed scripts may be sent from one end of the transmission path 7 to the other end to serve as ground truth script. It should be understood that sending scripts in such a manner is much less complex than sending original audio signals.

The received voice 22 is also provided to a VAD (voice activity detector) 13 which may utilize a convention process for detecting voice/speech from an audio signal. The VAD 13 is utilized as part of communication delay estimating process as further explained below in reference to FIGS. 5 and 6.

Another aspect of generating (350) call quality metrics is estimating the communication delay between communication devices 5 communicating via the transmission channel 7. FIG. 4 illustrates a high level process for this purpose. As mentioned above, aspects simulate a conversation between humans. In more detail, the simulated conversation includes "speaking turns" in which one of the communication devices 5 is transmitting audio containing voice/speech to another communication device 5 that is conducting a "listening turn". The process generally includes determining (410) a duration of a speaking turn and determining (420) a duration of a listening turn. FIGS. 5 and 6 further explain how these determinations (410, 420) are performed. Then the evaluation engine 18 may estimate (430) the communication delay based on the difference between the duration of the listening turn and the duration of the speaking turn.

Figure 5:
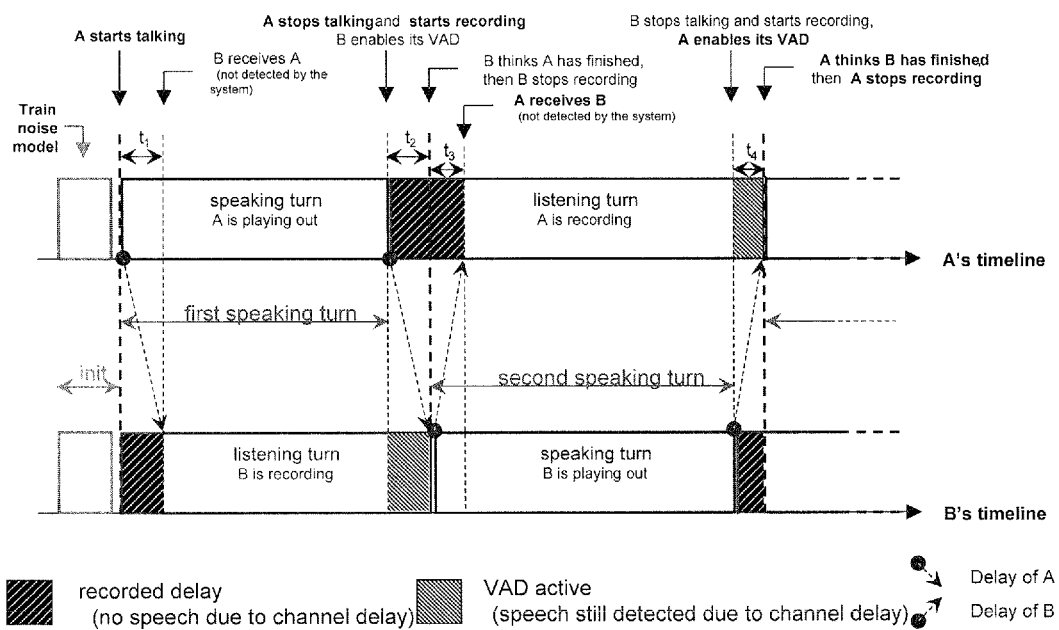
FIG. 5 is a data flow and timing diagram illustrating example data flows and actions in a system for assessing conversational quality of a real-time communication application according to one or more embodiments described herein.
Figure 6:
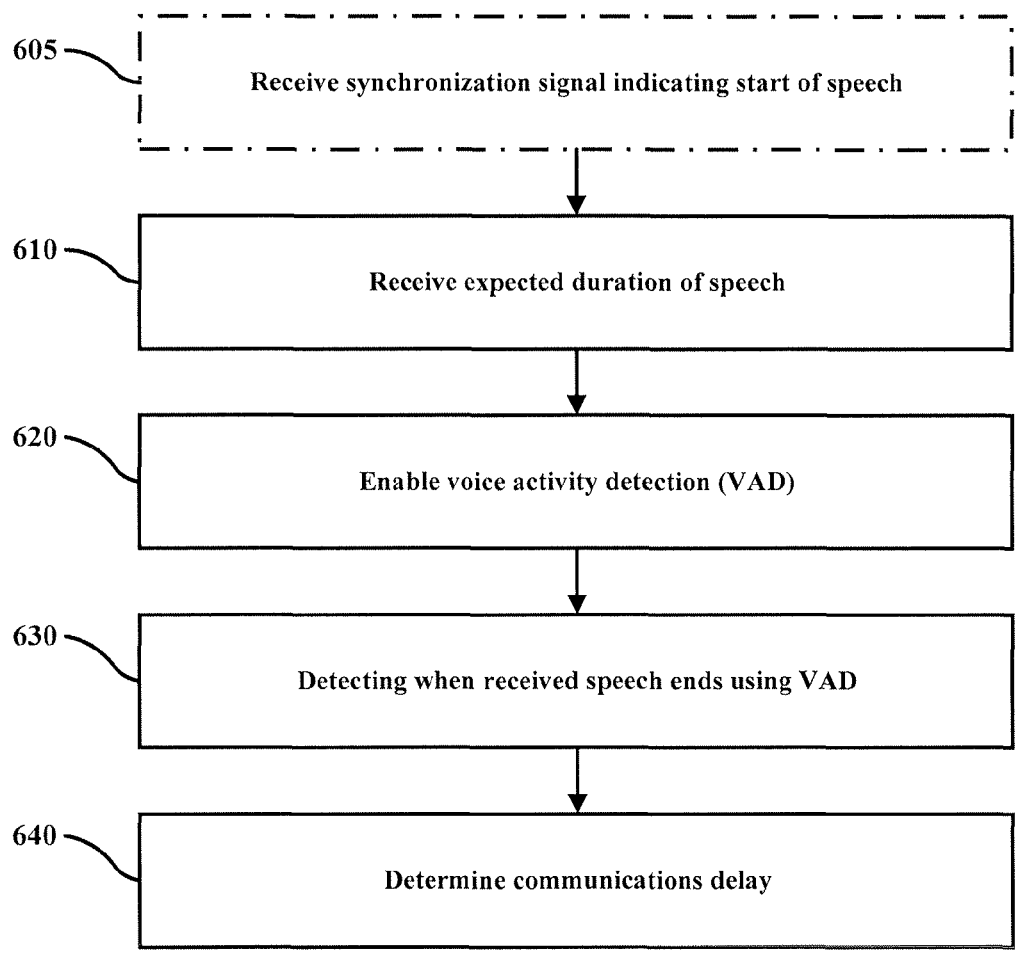
FIG. 6 is a flowchart illustrating an inventive process for estimating communication delay according to according to one or more embodiments described herein.

FIG. 5 is an example timeline for simulating a conversation and will be explained in conjunction with FIG. 6 which shows a more detailed process for determining communication delay.

In accordance with one or more embodiments described herein and as shown in FIG. 5, the simulation may begin by training a noise model for a voice activity detector (VAD) 13. The VAD 13 is used later in the simulation to determine whether a received voice has finished, upon which one end of the transmission path switches its role from a listener to a speaker. Then, according to a pre-defined reference script 19, one end of the transmission path, for example, User "A", starts talking, while the other end, User "B", listens. Having the pre-defined reference script 19, User "B" knows the duration of User "A" in this turn, but User "B" does not know how long the transmission delay may be. User "B" activates its VAD 13 before the earliest time User "A" can finish, so as to observe the actual finish of User "A". In this way, User "B" can also estimate the transmission delay from User "A". When User "B" detects the finishing of User "A", User "B" starts to speak. An entire conversation may be simulated in this manner.

It is to be understood that "user activates" is a short-hand expression and that the activation of the VAD 13 may be performed by call engine 12. More specifically, the call engine 12 activates VAD 13 right after finishing a "speaking turn". In an alternative embodiment, the call engine 12 may activate the VAD 13 during of the other party's "speaking turn" (since the voice from the other party cannot be finished before that) in order to improve performance of the VAD 13 (e.g. by permitting more time to train the noise model). In a further alternative, the call engine 12 can make use of the synchronize signal FIG. 6 more formally illustrates a process for determining a communication delay by a communication device 10 that is listening. In an optional embodiment, a synchronization signal may be received (605) from the communication device 5 that is speaking and the synchronization signal indicates the start of speech in the audio signal being transmitted by the speaking communication device 5.

After or in conjunction with receiving (605) the sync signal, the communication device 5 may receive (610) an expected duration of the speech in the audio signal. The expected duration may be known a priori or may be measured using another VAD 13 (connected to the output of the call engine 12) on the speaking communication device 5 as the voice signal is being transmitted.

The expected duration of the speech is useful for enabling (620) the VAD 13 on the listening communication device 5 so that the VAD 13 can accurately detect (630) when the received speech, delayed by the transmission channel 7, has ended. With this information available, the evaluation engine 18 may determine (640) the communication delay which, in some aspects, forms part of the call quality metric.

The determination (640) of the communication delay may be based on the following analysis and time periods (see FIG. 5). The time period are as follows:

$t_1$: interval between the "A starts speaking" and the "B receives A"

$t_2$: interval between the "A stops speaking" and the "B stops listening" (at the end of the first speaking turn)

$t_3$: interval between the "B starts speaking" and the "A receives B" (analogous to $t_1$)

$t_4$: interval between the "B stops speaking" and the "A stops listening" (at the end of the second speaking turn, analogous to $t_2$)

The delay perceived by the listening communication device 5 is the sum of $t_2$ and $t_3$. One issue is that $t_3$ is unknown. Likewise $t_1$ is unknown. One may assume, however, that the delay is constant throughout each speaking and listening turn. Thus, $t_1 \cong t_2$ and $t_3 \cong t_4$ holds. For example, for the second speaking turn the evaluation engine 18 may approximate the delay of speaker B, which is the delay perceived by listener A, as $t_2+t_4$. Such an analysis assumes that the VAD 13 detects the end-of-speech event at the correct time.

Figure 7:
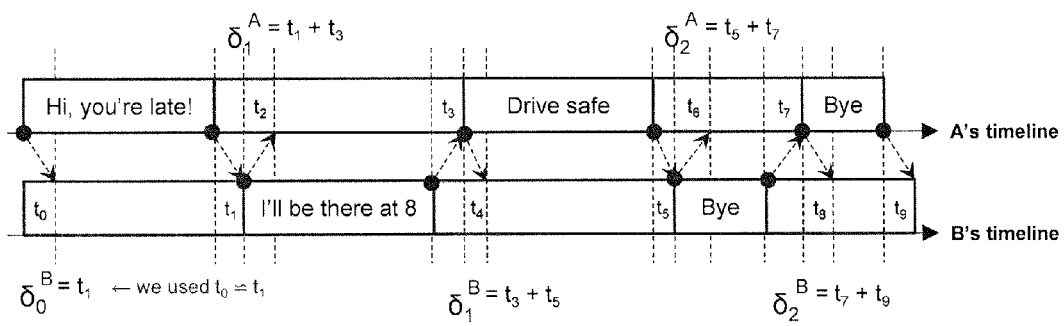
FIG. 7 is a data flow and timing diagram illustrating data flows and actions for determining overall communication delay according to one or more embodiments described herein.

In order to increase the accuracy of the estimated communication delay, the evaluation engine 18 may implement the process illustrated in FIG. 7. As shown therein, on each side of the transmission channel 7 and for each listening turn of the communication device 5, the evaluation engine 18 collects the estimated delay terms $\delta_i$ and the overall delay score terms $\delta$ is the average value of the terms $\delta_i$ terms. The overall delay scores for A and B are $\delta^A$ and $\delta^B$ respectively and they are a function of both VADs 13 activation periods.

According to other aspects, the determination (340) of communication delay may also include determining a relative delay score. Generally speaking it is unknown whether a) human beings are more delay tolerant when the listening and/or speaking turns are longer or b) the perceived delay is only affected by the absolute delay. To account for a) aspects may calculate a relative (overall) delay score. To perform such a calculation, an optimal listening turn duration (D*) is defined that is equal to the duration of the speaking turn using an ideal channel (no transmission delay). An actual turn duration (D) is defined as Speaking turn duration+ silence at the beginning of the listening turn, where D≥D*. The evaluation engine 18 may then calculate a Relative delay score: $S_D = D/D^* - 1$ and a Relative overall delay score which is an average over Relative delay scores $S_D$.

It should also be noted that although the above examples are described in the context of a two-participant communication session, the methods and systems of the present disclosure may easily be extended to multi-party scenarios.

Moreover, embodiments may be used in, for example, a simulated call or in online monitoring. In a simulated call, the duration can be known a priori, while in an online monitoring, the duration has to be detected by applying a VAD 13 to the near-end signal. The duration can be sent to the receiver through an additional channel. The duration can be used for two purposes: 1) calculating the transmission delay, as described above, 2) optimizing the VAD 13 to detect the end of the transmitted signal as also described above. Note that for 2) it is preferable to use an additional channel to communicate the duration in order to have a low delay. In the optional Sync signal embodiment, the duration can be sent when one end finishes its listening turn.

Figure 8:
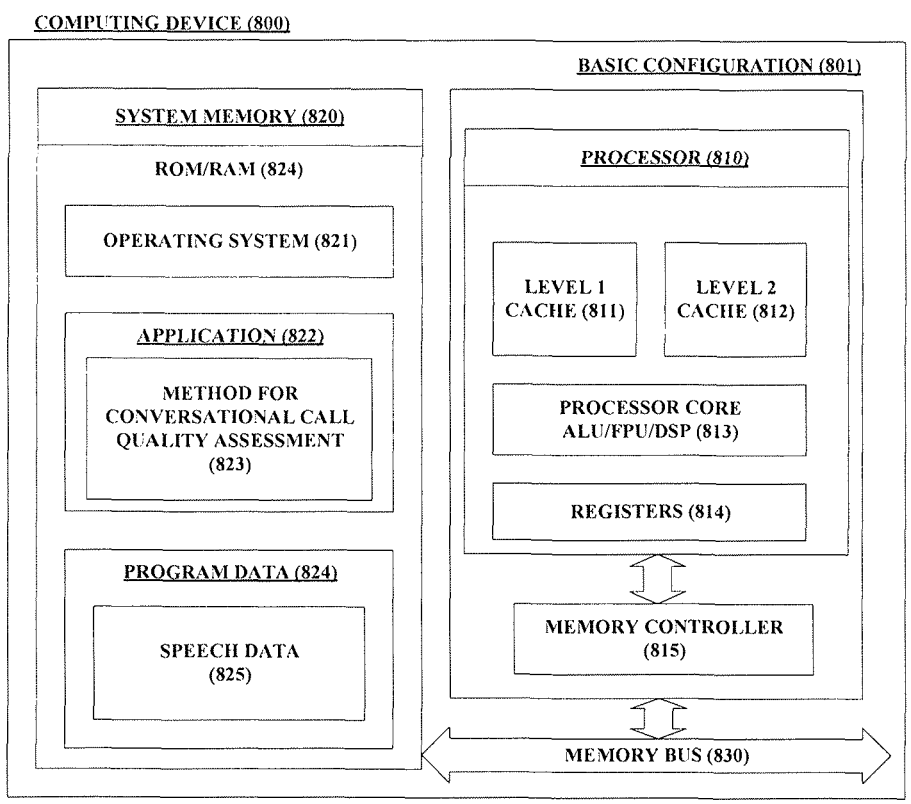
FIG. 8 is a block diagram illustrating an example computing device arranged for assessing conversational quality of a real-time communication application according to one or more embodiments described herein.

FIG. 8 is a high-level block diagram of an exemplary computer (800) arranged for assessing conversational quality of a real-time communication application, according to one or more embodiments described herein. The exemplary computer (800) may be used to implement the evaluator 10 in a communication device 5 or as a standalone machine that includes an RTC client 20.

In a very basic configuration (801), the computing device (800) typically includes one or more processors (810), system memory (820), and ROM/RAM (824). A memory bus (830) can be used for communicating between the processor (810) and the system memory (820).

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (815) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more applications (822), and program data (824). The application (822) may include method for conversational call quality assessment (823) for assessing speech quality by simulating a conversation between two or more participants, in accordance with one or more embodiments described herein. Program Data (824) may include storing instructions that, when executed by the one or more processing devices, implement a method for assessing speech quality of a real-time communication application through conversational simulation.

Additionally, in accordance with at least one embodiment, program data (824) may include speech data (825) including pre-recorded conversation(s) and reference script(s) 19. In some embodiments, the application (822) can be arranged to operate with program data (824) on an operating system (821).

The computing device (800) can have additional features or functionality, and additional interfaces to facilitate communications between the configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory computer readable medium used to actually carry out the distribution. Examples of a non-transitory computer readable medium medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The systems and methods discussed herein do not require collection or usage of user personal information. In situations in which certain implementations may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A computer-implemented method to evaluate audio quality of a real-time communication system that includes at least two communication devices, comprising:
   receiving a reference script, the reference script containing linguistic contents in text form of an audio signal sent to at least one of the communication devices, wherein the reference script excludes audio;
   receiving the audio signal;
   generating an evaluation transcript in text form by applying speech recognition to the audio signal;
   comparing the reference script with the evaluation transcript;
   generating a call quality metric of the real-time communication system based on the comparison;
   determining a duration of a speaking turn;
   determining a duration of a listening turn from the audio signal being received by one of the communication devices; and
   estimating a communication delay of the audio signal based on the duration of the speaking turn and the listening turn.

2. The computer-implemented method of claim 1, said determining a duration of the speaking turn including inputting a duration value.

3. The computer-implemented method of claim 1, said determining a duration of the speaking turn including:
   applying a voice activity detection process to the audio signal being sent from one of the communication devices.

4. The computer-implemented method of claim 1, said determining a duration of the listening turn including:
   activating a voice activity detection process based on the duration of the speaking turn; and
   determining when the received speech in the listening turn ends using the voice activity detection process,
   wherein determining the duration of the listening turn is based on determining when the listening turn ends.

5. The computer-implemented method of claim 4, said determining a duration of the listening turn further including:
   receiving a synchronization signal indicating a start of the received speech,
   wherein determining the duration of the listening turn is based on receipt timing of the synchronization signal and on when the listening turn ends.

6. A computer-implemented method of evaluating audio quality of a real-time communication system using a first communication device and a second communication device communicating via a real-time communication system, the first and second communication devices implementing a method, comprising:
   receiving, at the first and second communication devices, a turn-based reference script containing linguistic contents of turn-based speech including respective speaking turns for the first and second communication devices;
   generating, at the first and second communication devices during each of their respective speaking turns, audible speech;
   receiving audio signals, at the second and first communication devices during each of their respective listening turns, the audio signals including the produced speech from respectively corresponding speaking turns of the first and second communication devices;
   generating, at the first and second communication devices during each of their respective listening turns, evaluation transcripts by applying speech recognition to the produced speech in the received audio signal;
   comparing, at the first and second communication devices, the turn-based reference script with the respective evaluation transcript for each of the respectively corresponding listening turns; and
   generating an overall call quality metric of the real-time communication system based on the comparisons.

7. The computer-implemented method of claim 6, further comprising:
   receiving, at the first and second communication devices, expected durations of the speech in the audio signal for each of the speaking turns of the respectively corresponding second and first communication devices;
   enabling, at the first and second communication devices during their respective listening turns, voice activity detection according to the expected duration of the speech in the audio signal;
   detecting, at the first and second communication devices during their respective listening turns, when the speech being received for each listening turn ends using the voice activity detection; and
   determining, at the first and second communication devices during their respective listening turns, communication delays for each listening turn based on the expected durations and the determination of when the speech being received for each listening turn ends.

8. The computer-implemented method of claim 7, further comprising:
   receiving, at the first and second communication devices during their respective listening turns, a synchronization signal for each listening turn indicating a start of the received speech,
   wherein the step of determining the communication delays determines the communication delays based on receipt timings of the synchronization signals and the determination of when the speech being received for each listening turn ends.

9. The computer-implemented method according to claim 6, wherein the audio signal containing speech is generated by a text-to-speech process based on the turn-based reference script.

10. The computer-implemented method according to claim 6, wherein the audio signal containing speech is generated by playing back a speech recording of each speaking turn and the evaluation transcript is generated using speech recognition.

11. The computer-implemented method according to claim 6, said generating an overall call quality metric of the real-time communication system based on the comparisons including:

for each listening turn (i) of the first and second communication device:
  aligning the evaluation transcript of the listening turn with a corresponding speaking turn of the turn-based reference script, and
  determining a number of corrections $C_i$, deletions $D_i$, insertions, $I_i$, and substitutions $S_i$ for each listening turn (i) by comparing the aligned evaluation transcript of the listening turn with the corresponding speaking turn of the turn-based reference script,
individually summing $C_i$, $D_i$, $I_i$, and substitutions $S_i$ over all the listening turns (i) to respectively calculate and C, D, I and S; and
calculating an overall word error rate (WER) based on WER=(D+I+S)/(S+D+C).

12. An apparatus to evaluate audio quality of a real-time communication system that includes at least two communication devices, comprising:
  a processor and a non-transitory storage device storing instructions that are operable, when executed by the processor, to cause the processor to perform operations including:
    receiving a reference script, the reference script containing linguistic contents in text form, of an audio signal sent to at least one of the communication devices, wherein the reference script excludes audio;
    receiving the audio signal;
    generating an evaluation transcript in text form by applying speech recognition to the audio signal;
    comparing the reference script with the evaluation transcript;
    generating a call quality metric of the real-time communication system based on the comparison;
    determining a duration of a speaking turn;
    determining a duration of a listening turn from the audio signal being received by one of the communication devices; and
    estimating a communication delay of the audio signal based on the duration of the speaking turn and the listening turn.

13. The apparatus of claim 12, said determining a duration of the speaking turn including inputting a duration value.

14. The apparatus of claim 12, said determining a duration of the speaking turn including:
  applying a voice activity detection process to the audio signal being sent from one of the communication devices.

15. The apparatus of claim 12, said determining a duration of the listening turn including:
  activating a voice activity detector based on the duration of the speaking turn; and
  determining when the received speech in the listening turn ends using the voice activity detector,
  wherein determining the duration of the listening turn is based on when the listening turn ends as determined using the voice activity detector.

16. The apparatus of claim 15, said determining a duration of the listening turn further including:
  receiving a synchronization signal indicating a start of the received speech,
  wherein determining the duration of the listening turn is based on receipt timing of the synchronization signal and on when the listening turn ends.

17. A receiving communication device to evaluate audio quality of a real-time communication received from a transmitting communication device via a real-time communication system, the receiving communication device comprising:
  a processor and a non-transitory storage device storing instructions that are operable, when executed by the processor, to cause the processor to perform operations including:
    receiving an audio signal, the audio signal including speech;
    receiving a reference script containing linguistic contents in text form, of the speech included in the audio signal, wherein the reference script excludes audio;
    receiving an expected duration of the speech in the audio signal;
    enabling a voice activity detector according to the expected duration of the speech in the audio signal;
    detecting when the speech being received ends using the voice activity detector;
    determining a communication delay based on the when expected duration and the determination of when the speech being received ends;
    generating an evaluation transcript in text form by applying speech recognition to the speech in the received audio signal;
    comparing the reference script with the evaluation transcript; and
    generating a call quality metric of the real-time communication system based on the comparison.

18. The receiving communication device of claim 17, the processor and storage device storing further instructions that are operable, when executed by the processor, to perform additional operations including:
  receiving a synchronization signal indicating a start of the received speech,
  wherein determining the communication delay determines the communication delay based on receipt timing of the synchronization signal and the determination of when the speech being received ends.

19. The receiving communication device according to claim 17, wherein the audio signal containing speech is generated by a text-to-speech process based on the reference script.

20. The receiving communication device according to claim 17, wherein the audio signal containing speech is generated by playing back a speech recording and the reference script is generated using speech recognition.

* * * * *